United States Patent [19]

Miller

[11] 4,187,188

[45] Feb. 5, 1980

[54] ELECTRICAL DEVICE CONTAINING A HALOGENATED ALKANOATE DIELECTRIC FLUID

[75] Inventor: Dennis P. Miller, Midland, Mich.

[73] Assignee: The Dow Chemical Company, Midland, Mich.

[21] Appl. No.: 960,332

[22] Filed: Nov. 13, 1978

[51] Int. Cl.$^2$ .............................................. H01B 3/24
[52] U.S. Cl. ...................................... 252/65; 336/94; 361/317
[58] Field of Search ............... 252/65, 63; 174/17 LF; 361/317, 318; 336/94

[56] References Cited

U.S. PATENT DOCUMENTS

| | | | |
|---|---|---|---|
| 3,701,730 | 10/1972 | Daniels et al. | 252/49.9 |
| 3,804,792 | 4/1974 | Pews | 260/31.6 |

*Primary Examiner*—Harris A. Pitlick

[57] ABSTRACT

In an electrical device containing a dielectric fluid, the improvement comprising employing as the dielectric fluid a compound of the formula:

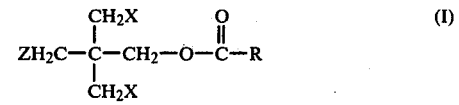

where X is independently —Cl or —Br; Z is independently

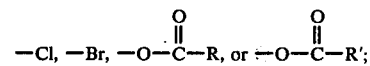

R and R' are independently $(CH_2)_nCH_3$; and n is an integer of 0 to 10.

6 Claims, No Drawings

ELECTRICAL DEVICE CONTAINING A HALOGENATED ALKANOATE DIELECTRIC FLUID

BACKGROUND OF THE INVENTION

The present invention relates generally to dielectric fluids for electrical devices, and more in particular to halogenated alkanoate dielectric fluids.

Dielectric fluids are well-known electric insulating materials. They are used extensively in power capacitors, transformers, and similar electrical equipment designed to be insulated with a liquid. Among the advantages that render fluids valuable as dielectric agents are high electrical resistance, high dielectric strength, low power factor, low freezing points, high boiling points, and their fire retardant and substantially non-corrosive nature.

The most widely used fire retardant dielectric fluids heretofore have been highly chlorinated hydrocarbons, such as the polychlorinated biphenyls (PCB's). While PCB's are functionally advantageous, they are objectionable because of their toxicity and persistence in the environment. For this reason, acceptable fire retardant substitutes have been actively sought.

SUMMARY OF THE INVENTION

The present invention is an improvement in an electrical device containing a dielectric fluid. The improvement comprises employing as the dielectric fluid a compound of the formula:

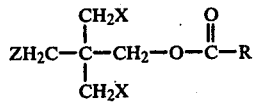

where X is independently —Cl or —Br; Z is independently

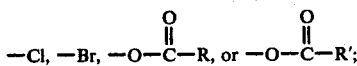

R and R' are independently $(CH_2)_nCH_3$; and n is an integer of 0 to 10.

The present dielectric fluids have excellent fire retardant properties coupled with the physical properties desirable for a dielectric agent. Moreover, the present fluids advantageously allow electrical equipment manufacturers to meet varying dielectric constant requirements while still maintaining all other necessary physical properties of the dielectric agent.

DESCRIPTION OF THE INVENTION

Dielectric fluids corresponding to Formula I are alkanoate and dialkanoate derivatives of dihaloneopentyl glycol and trihaloneopentyl alcohol. Illustrative of such compounds are:

2,2-bis(bromomethyl)-1,3-propanediyl dipropanoate
2,2-bis(bromomethyl)-1,3-propanediyl dibutanoate
2,2-bis(bromomethyl)-1,3-propanediyl dipentanoate
2,2-bis(bromomethyl)-1,3-propanediyl dihexanoate
2,2-bis(bromomethyl)-1,3-propanediyl diheptanoate
2,2-bis(bromomethyl)-1,3-propanediyl dioctanoate
2,2-bis(bromomethyl)-1,3-propanediyl dinonanoate
2,2-bis(bromomethyl)-1,3-propanediyl didecanoate
2,2-bis(bromomethyl)-1,3-propanediyl diundecanoate
2,2-bis(bromomethyl)-1,3-propanediyl didodecanoate
2,2-bis(bromomethyl)-1,3-propanediyl propanoate butanoate
2,2-bis(bromomethyl)-1,3-propanediyl propanoate octanoate
2,2-bis(bromomethyl)-1,3-propanediyl hexanoate dedecanaote
2,2-bis(chloromethyl)-1,2-propanediyl dipropanoate
2,2-bis(chloromethyl)-1,2-propanediyl dibutanoate
2,2-bis(chloromethyl)-1,2-propanediyl dipentanoate
2,2-bis(chloromethyl)-1,2-propanediyl dihexanoate
2,2-bis(chloromethyl)-1,2-propanediyl diheptanoate
2,2-bis(chloromethyl)-1,2-propanediyl dioctanoate
2,2-bis(chloromethyl)-1,2-propanediyl dinonanoate
2,2-bis(chloromethyl)-1,2-propanediyl didecanoate
2,2-bis(chloromethyl)-1,2-propanediyl diundecanoate
2,2-bis(chloromethyl)-1,2-propanediyl didodecanoate
2,2-bis(chloromethyl)-1,3-propanediyl hexanoate dodecanoate
2-bromomethyl-2-chloromethyl-1,3-propanediyl dipropanoate
2-bromomethyl-2-chloromethyl-1,3-propanediyl dioctanoate
3-bromo-2,2-bis(bromomethyl)propyl propanoate
3-chloro-2,2-bis(bromomethyl)propyl propanoate
3-chloro-2-bromomethyl-2-chloromethylpropyl propanoate
3-chloro-2,2-bis(chloromethyl)propyl propanoate
3-bromo-2-bromomethyl-3-chloromethyl propyl propanoate
3-bromo-2,2-bis(chloromethyl)propyl propanoate; and the like.

A preferred class of compounds of formula I are the dialkanoate derivatives of dibromoneopentyl glycol. These derivatives have the general formula:

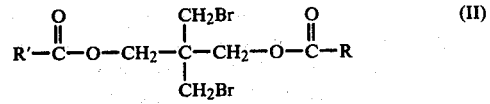

where R and R' have the same meaning as above. Illustrative of compounds of formula II are:

2,2-bis(bromomethyl)-1,3-propanediyl dipropanoate;
2,2-bis(bromomethyl)-1,2-propanediyl dibutanoate;
2,2-bis(bromoethyl)-1,3-propanediyl dihexanoate;
2,2-bis(bromomethyl)-1,3-propanediyl dioctanoate;
2,2-bis(bromomethyl)-1,3-propanediyl didecanoate;
2,2-bis(bromomethyl)-1,3-propanediyl didodecanoate; and the like.

Compounds of formula I are a known class of compounds. They can be conveniently prepared by reacting a 2,2-bis(halomethyl)1,3-propanediol or a 3-halomethyl-2,2-bis(halomethyl)-propanol with at least one aliphatic carboxylic acid having from 3 to 12 carbon atoms.

The dielectric fluids of the present invention are composed of substantially only one or more compounds of formula I. However, minor amounts of additives can optionally be employed in the dielectric fluid. Such additives can include corrosion inhibitors, hydrolytic stabilizers, dyes, pour point depressants, antioxidants, viscosity index improvers, lubricity agents, other dielectric fluids, and the like. The amount of the above described materials employed in the dielectric fluid can be any quantity which will not substantially adversely affect the desired results derived from the present invention compositions. In general, such amounts will be from about 0 to about 20 percent by weight of the dielectric fluid.

The electrical devices which can be improved by the use of the dielectric fluids corresponding to formula I are well known. These devices are designed to be insulated with a liquid. Illustrative of such devices are transformers, power capacitors, condensers, cables, terminal bushings, circuit breakers, and the like. The dielectric fluids are especially useful in power capacitor and transformers. Examples of such capacitors and transformers are found in U.S. Pat. Nos. 3,833,978 and 4,019,996, which references are incorporated herein by reference.

The present invention is further illustrated by the following examples:

EXAMPLE 1

A two-liter reaction vessel equipped with a stirrer, nitrogen sparge tube, and a dean stark top was charged with 6 moles of 2,2-bis(bromomethyl)-1,3-propanediol (sold by The Dow Chemical Company under the trade name FR-1138) and 12 moles of octanoic acid. Gaseous nitrogen was introduced into the reactor. The reaction mixture was heated to about 160° C., and the reaction was allowed to continue until the acid number was about 20 milligrams of KOH per gram of liquid. An additional 0.6 mole of 2,2-bis(bromomethyl)-1,3-propanediol was added, and the acid number reduced to about 2.3. Twenty milliliters of concentrated $H_2SO_4$ were then added to the reaction mixture. The reaction proceeded until an acid number of about 0.3 was obtained. One hundred fifty grams of calcium carbonate were then added to neutralize the residual sulfuric acid. The calcium carbonate was subsequently filtered from the liquid. A dark, low viscosity liquid was obtained. The liquid is employed as a dielectric fluid in an electrical device. This liquid was identified as 2,2-bis(bromomethyl)-1,3-propanediyl dioctanoate. Various physical properties were measured by well-known techniques. The results are shown in the Table.

EXAMPLES 2-7

In a manner substantially identical to that described in Example 1, various compounds corresponding to formula I were prepared by varying the carboxylic acid used. The resulting liquids are employed as dielectric fluid in an electric device. The results are shown in the Table.

From the results illustrated in the Table, it is clear that a fire retardant dielectric fluid having excellent physical properties can be produced for use in electrical devices. Moreover, by varying the carboxylic acid reactant employed, various dielectric constants can be obtained with a similarity of other physical properties.

TABLE

| Reactants | 1 | 2 | 3 | 4 | 5 | 6 | 7 |
|---|---|---|---|---|---|---|---|
| Moles 2,2-bis (bromomethyl)-1,3-propanediol | 6.0 | 3.0 | 2.5 | 3.0 | 2.5 | 2.5 | 2.5 |
| Moles Octanoic Acid | 12.0 | — | — | — | — | — | — |
| Moles Hexanoic Acid | — | — | — | 6.0 | — | — | 2.5 |
| Moles Decanoic Acid | — | — | 5.0 | — | — | — | — |
| Moles Lauric Acid | — | — | — | — | 5.0 | — | 2.5 |
| Moles Propionic Acid | — | — | — | — | — | 5.0 | — |
| Moles Butric Acid | — | 6.0 | — | — | — | — | — |
| Properties | | | | | | | |
| %Bromine | 31.1 | 39.7 | 27.6 | 34.9 | 25.5 | 42.7 | 29.5 |
| Flash Point (°F.) | 410 | 395 | 435 | 405 | 475 | — | 458 |
| Fire Point (°F.) | >540 | 460 | 490 | 480 | 540 | — | 487 |
| Pour Point (°F.) | −58 | −26 | −31 | −58 | 5 | — | −22 |
| Viscosity at 77° F. (cps) | 61 | 61 | 63 | 72 | 85 | 59 | 61 |
| Refractive Index | 1.4810 | 1.4948 | 1.4770 | 1.4815 | 1.4799 | — | 1.47783 |
| Dielectric Constant at 100 $H_2$ | 5.3 | 14.2 | 5.1 | >15 | 4.6 | 9.77 | 5.9 |
| Specific Gravity | 1.284 | 1.475 | 1.188 | 1.324 | 1.163 | — | 1.214 |

What is claimed is:

1. In an electrical device containing a dielectric fluid, the improvement which comprises employing as the dielectric fluid a compound of the formula:

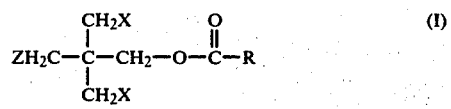

where:

X is independently —Cl or —Br;
Z is independently

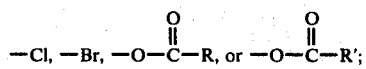

R and R′ are independently $(CH_2)_n CH_3$; and
n is an integer of 0 to 10.

2. The device of claim 1 wherein the electrical device is a power capacitor.

3. The device of claim 1 wherein the electrical device is a transformer.

4. The device of claim 1 wherein the dielectric fluid is a compound of the formula:

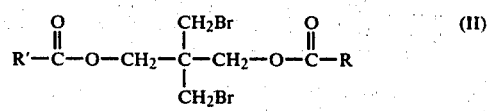

5. The device of claim 4 wherein the dielectric fluid is selected from the group consisting of:
2,2-bis(bromomethyl)-1,3-propanediyl dipropanoate
2,2-bis(bromomethyl)-1,3-propanediyl dibutanoate
2,2-bis(bromomethyl)-1,3-propanediyl dihexanoate
2,2-bis(bromomethyl)-1,3-propanediyl dioctanoate
2,2-bis(bromomethyl)-1,3-propanediyl didecanoate
2,2-bis(bromomethyl)-1,3-propanediyl didodecanoate.

6. The device of claim 5 wherein the dielectric fluid is 2,2-bis(bromomethyl)-1,3-propanediyl dioctanoate.

* * * * *